F. W. HANNA.
SELF REGISTERING WATER METER.
APPLICATION FILED DEC. 19, 1908.
938,850.
Patented Nov. 2, 1909.
Fig. 1
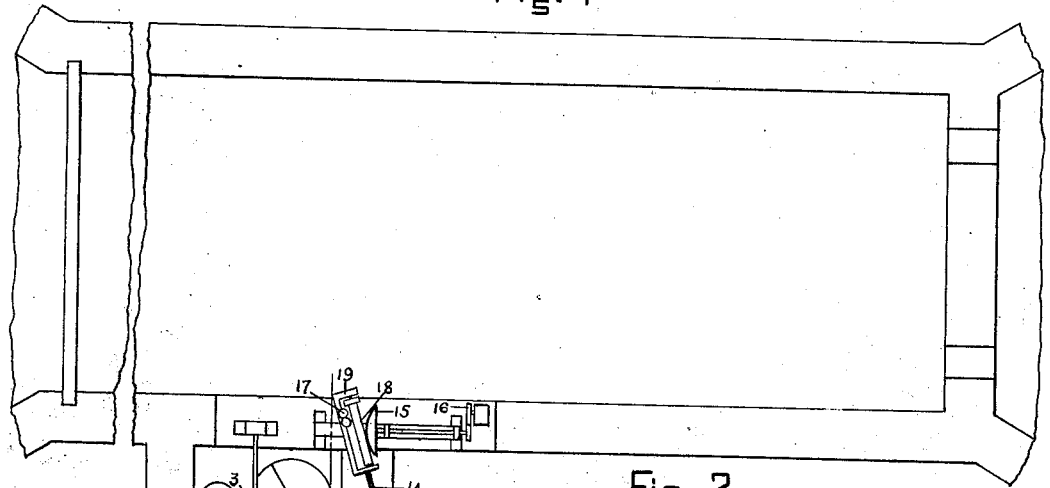
Fig. 2
Fig. 3
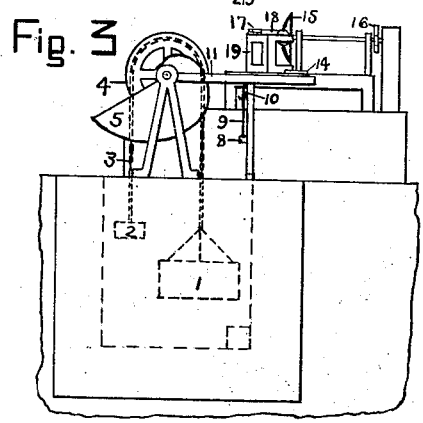
Fig. 4
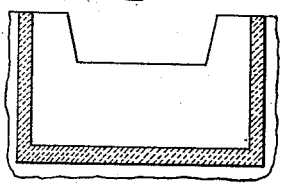
Fig. 5
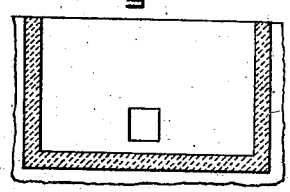
Witnesses
Thos. E. Brown
Joseph H Root
Inventor
Frank W. Hanna

UNITED STATES PATENT OFFICE.

FRANK W. HANNA, OF DEFIANCE, IOWA, ASSIGNOR OF ONE-HALF TO JOSEPH H. ROOT, OF PORT BYRON, NEW YORK.

SELF-REGISTERING WATER-METER.

938,850.     Specification of Letters Patent.     Patented Nov. 2, 1909.

Application filed December 19, 1908. Serial No. 468,285.

*To all whom it may concern:*

Be it known that I, FRANK W. HANNA, a citizen of the United States, residing at Defiance, in the county of Shelby and State of Iowa, have invented a new and useful Improvement in Self-Registering Water-Meters, of which the following is a specification.

The invention relates to a self-registering water meter and has for its object the measuring and registering of the quantity of water discharged through a stilling box from a canal, reservoir or other receptacle for carrying or storing water. This object is attained by the use of a counterweighted float actuated by the fluctuating height of water in the stilling box and controlling, by means of a cam-wheel and a sliding bar maintained in contact therewith, the arm of a spherical mechanical integrator connected with a clock mechanism and so adjusted as to register on suitable dials the quantity of water passing through the stilling box.

In the accompanying drawing illustrating the invention, Figure 1 shows a plan of a stilling box, a counterweighted float and float chamber and a spherical mechanical integrator; Fig. 2 shows a vertical section of the float chamber taken in a plane represented by the line 2 3 in Fig. 1, a view of the float and cam-wheel and of their supports and a section of the sliding bar and of its guides; Fig. 3 shows a side elevation of the principal part of the mechanism shown in plan in Fig. 1; and Figs. 4 and 5 show on a smaller scale right sections of the stilling box as constructed for passing its discharge respectively over a weir and through an orifice.

In Figs. 1, 2 and 3 the float 1 is connected to the counterweight 2 by the chain 3 passing over the sheave 4 mounted in common with the cam-wheel 5 on the shaft 6. The sliding bar 7 kept in contact with the cam-wheel 5 by the weight 8 and the cord 9 passing over the pulley 10 moves in the grooved guides 11 and is connected by means of the rod 12 to the sliding swivel 13 attached to the integrator arm 14. The spherical propeller 15 actuated by the clock-driven gear 16 operates the registering dials 17 through the mechanical connections provided by the cylinder 18, the axis of rotation of which intersects that of the spherical propeller. The cylinder 18 with its axis parallel to the center line of the integrator arm 14 is set in the frame 19 mounted on an axis perpendicular to and intersecting the axes of rotation of the cylinder and the propeller. The perimeter of the cam-wheel for discharges over a weir, neglecting velocity of approach in the stilling box, is determined by the polar equation, $$r = C\, R^{\frac{2}{3}}\, \theta^{\frac{3}{2}},$$

with the origin of coördinates in the plane of the cam-wheel on the center line of the shaft, in which equation $r$ is the radius vector of the perimeter of the cam-wheel, R the radius of the sheave over which the float chain passes, $\theta$ the angle of rotation through which the shaft turns as the water surface in the stilling box rises from the elevation of the weir crest to the elevation at which the point $(r, \theta)$ of the perimeter of the cam-wheel comes in contact with the end of the sliding bar and C a constant for fixing a desirable value for the ratio of "$r$" to "$R^{\frac{2}{3}}\, \theta^{\frac{3}{2}}$." Where necessity requires, the values of $r$ may be corrected for velocity of approach in the stilling box. Where the discharge takes place through an orifice, the perimeter of the cam-wheel, neglecting velocity of approach in the stilling box, is determined by the polar equation, $$r = C\, R^{\frac{1}{2}}\, \theta^{\frac{1}{2}},$$

in which $r$ and R have the significance above noted and $\theta$ represents the angle of rotation through which the cam-wheel shaft turns as the water surface in the stilling box rises from the elevation of the center of the orifice to the elevation at which the point $(r, \theta)$ of the perimeter of the cam-wheel comes in contact with the end of the sliding bar and C represents a constant for fixing a desirable value for the ration of "$r$" to "$R^{\frac{1}{2}}\, \theta^{\frac{1}{2}}$." The values of $r$ in this latter equation may also be corrected for velocity of approach in the stilling box if required.

In order to keep the size of the cam-wheel within desirable limits, it is necessary to limit the values of $r$ in the above polar equations for particular values of R, by assigning a suitable definite integral, or fractional value to C. As an illustration of this point, if C is assigned a value of 1, the lengths of $r$ for any constant value of R would be twice as great as they would if C were assigned the value of $\frac{1}{2}$, and the cam-wheel required under the first assigned value would be greater than it would under the second such value.

The connections between the float and the arm of the mechanical integrator are such that, when the water surface in the stilling box is at any given elevation above the weir crest forming the stilling box outlet or above the center of the orifice forming the said outlet, the integrator arm maintains the registering device of the integrator in such a position that motion proportional to the simultaneous discharge over the said weir or through the said orifice is transmitted to it by the clock driven spherical propeller. The unit discharge element of the register is affected by the position of the integrator arm and the time element of the discharge register is supplied by the clock-driven spherical propeller. The registering dials indicate the quantity of water discharged in any given period of time in units depending for their values on the instrumental constants of the mechanical integrator. In accordance with the usual customs of measuring water the instrumental constants will generally be so chosen that the register may indicate gallons, cubic feet or acre-feet.

Having thus described my invention, I now make the following claims:

1. The combination of a measuring box with an outlet in an outlet canal receiving water from a supply canal or reservoir; a counterweighted float actuated by the fluctuating height of water in the said measuring box; a spherical mechanical integrator provided with an arm, a propeller, a clock mechanism and a registering device; a cam-wheel, the successive radius vectors of the perimeter of which measured from the center of rotation are proportional to the successive discharges of the outlet in the measuring box for corresponding hydrostatic heads thereon between zero and a suitable upper limit; a means for mechanically connecting the said cam-wheel with the said float; and a means for mechanically connecting the said cam-wheel with the said arm of the said mechanical integrator; the whole effecting a register of the quantity of water discharged from the supply canal or reservoir.

2. The combination of a measuring box with a weir outlet in an outlet canal receiving water from a supply canal or reservoir; a counterweighted float actuated by the fluctuating height of water in the said measuring box; a sheave actuated by and supporting the said counterweighted float; a spherical mechanical integrator provided with an arm, a propeller, a clock mechanism and a registering device; a sliding bar for effecting movement of the said arm of the mechanical integrator, proportional to the discharges of the said weir outlet of the said measuring box; a cam-wheel the polar equation of the perimeter of which with the origin of coördinates in the plane of and at the center of rotation of the cam-wheel is $$r \text{ equals } C R^{\frac{1}{2}} \theta^{\frac{3}{2}},$$

in which $r$ is the radius vector of the perimeter of the cam-wheel, R the radius of the said sheave, $\theta$ the angle of rotation through which the said cam-wheel turns as the water rises from the elevation of the weir crest to the elevation at which the point, $r$, $\theta$, of the perimeter of the cam-wheel comes in contact with the said sliding bar, C a constant for fixing a desirable value for the ratio of $r$ to $R^{\frac{1}{2}} \theta^{\frac{3}{2}}$, in which $r$ is the radius vector of the perimeter of the cam-wheel, R the radius of the said sheave, $\theta$ the angle of rotation through which the said cam-wheel turns as the water rises from the elevation of the weir crest to the elevation at which the point, $r$, $\theta$, of the perimeter of the cam-wheel comes in contact with the said sliding bar, C a constant for fixing a desirable value for the ratio of $r$ to $R^{\frac{1}{2}} \theta^{\frac{3}{2}}$; a means for mechanically connecting the said cam-wheel with the said sheave; a means for securing continuous contact between the said sliding bar and the said cam-wheel; a means for mechanically connecting the said sliding bar with the said arm of the said mechanical integrator; the whole effecting a register of the quantity of water discharged from the supply canal or reservoir.

FRANK W. HANNA.

Witnesses:
 Thos. E. Brown,
 Joseph H. Root.